July 12, 1966  JAMES E. WEBB  3,260,055
ADMINISTRATOR OF THE NATIONAL AERONAUTICS
AND SPACE ADMINISTRATION
AUTOMATIC THERMAL SWITCH
Filed May 4, 1965

INVENTOR
ERVIN WIEBE
BY
ATTORNEYS

United States Patent Office 3,260,055
Patented July 12, 1966

3,260,055
AUTOMATIC THERMAL SWITCH
James E. Webb, administrator of the National Aeronautics and Space Administration with respect to an invention of Ervin R. Wiebe
Filed May 4, 1965, Ser. No. 453,231
11 Claims. (Cl. 62—6)

This invention relates to a temperature sensitive device and, more particularly, to an improved automatic thermal switch.

Several presently known refrigeration systems are capable of cooling down a gas or liquid to temperatures which are only a few degrees Kelvin. Generally, in such a system, a gas such as helium is cooled in successively interconnected cooling stages, each successive stage cooling down the gas to a lower temperature. Generally, the cooling down of the gas to as low as 40° K. can be accomplished quite speedily and efficiently with presently known relatively large cooling stages. However, the cooling down of the gas to lower temperatures can only be accomplished with any degree of efficiency by relatively small cooling stages which very gradually reduce the temperature of the gas to the desired minimum temperature.

It has been discovered that if during a portion of the cooling down process, one or more of the smaller stages are thermally coupled to a preceding stage of greater cooling capacity, the overall efficiency of the refrigeration system and the speed with which the gas is cooled to the desired temperature may be greatly increased. The improved performance is due to the use of some of the cooling capacity of a large stage to cool down one or more of the smaller stages to predetermined temperatures so that the amount of cooling which the smaller stages must attain is greatly reduced. However, once the temperature of the lower stages has been reduced to the predetermined temperature, it is desirable to thermally insulate one stage from the other so that each stage may attain a different temperature level.

A need therefore exists for an automatic thermal switch which can thermally couple two stages together to provide heat transfer therebetween but which insulates the stages from one another whenever a predetermined temperature is reached.

Accordingly, it is an object of the present invention to provide an automatic thermal switch for controlling the transfer of heat between different heat conducting stages.

Another object of the present invention is the provision of a novel thermal switch for providing thermal coupling between two stages only when the stages are above a predetermined temperature.

A further object of the present invention is to provide a novel and relatively inexpensive thermal switch utilizing a selected gas to thermally insulate two heat conducting stages from one another when the temperature of the gas is lowered below a switching temperature at which the gas solidifies or crystallizes.

Yet a further object of the present invention is the provision of a cryogenic thermal switch which is particularly useful for controlling the heat transfer between stages at cryogenic temperatures and for insulating the stages from one another whenever the stages are cooled to a lower predetermined temperature.

These and other objects of the invention are achieved by a thermal convection switch comprising two metal pipes which are coaxially fitted one over the other. Each of the pipes is sealed at an opposite end by a flange made of a metal having heat conduction properties similar to those of the metal pipes. The two flanges are then sealed to a cylinder which contains both of the coaxially arranged pipes which are supported as not to be in contact with one another. The cylinder is filled with a gas which solidifies at a specific temperature. The pipes and flanges are constructed of a metal which is a good heat conductor even at temperatures below the specific temperature, whereas the cylinder is constructed of a metal which is substantially a heat insulator at such a temperature.

As long as both flanges and the metal pipes are at temperatures substantially above the freezing temperature of the enclosed gas, the gas transfers heat by convection and conduction from the hotter pipe to the colder one, thus maintaining both flanges at about the same temperature. As the temperature of the flanges drops, the gas eventually solidifies, thus producing a hard vacuum between the coaxially mounted metal pipes which becomes thermally insulated from one another, insulating one flange from the other. The two flanges remain thermally insulated from one another as long as the temperature of the solidified gas does not rise above the specific temperature at which it solidifies so that the hard vacuum is maintained between the metal pipes.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
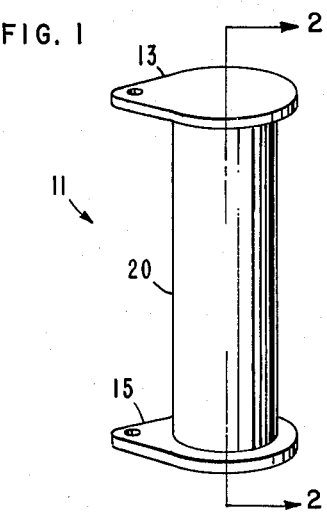
FIGURE 1 is an isometric view of the thermal switch of the present invention.
Figure 2:
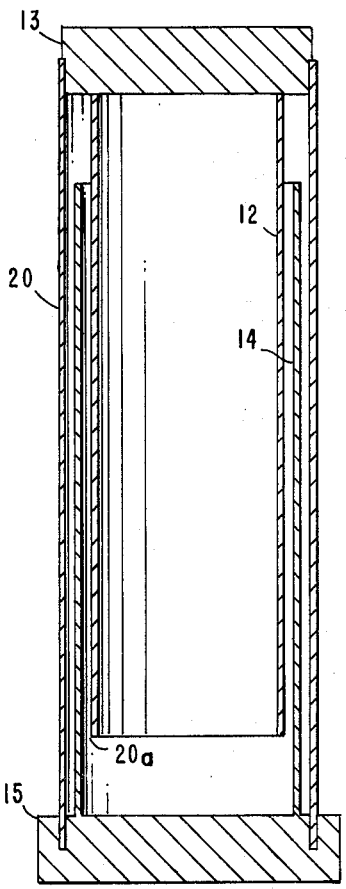
FIGURE 2 is a cross-sectional view of the thermal switch along lines 2—2.

Reference is now made to FIGURES 1 and 2 which are an isometric view and a cross-sectional view along lines 2—2 of FIGURE 1 of a switch 11 of the present invention. The switch comprises a metal pipe 12 coupled at one end to a metal flange 13. Another metal pipe 14 coaxially fitted over pipe 12 is coupled at another end to a second flange 15. Both flanges are sealed at opposite ends of a cylindrical housing 20 so that the metal pipes 12 and 14 are supported therein without touching one another. The space within the cylinder housing 20 is filled with a gas which, under the particular pressure conditions within the housing, will solidify or crystallize at a known temperature, hereafter also referred to as the switching temperature. Thus, as long as the temperature of the gas is above the switching temperature, pipes 12 and 14 are thermally coupled so that heat from the warmer of the two flanges is transferred by convection and conduction to the cooler flange. But, when the gas temperature reaches or drops below the switching temperature, the gas crystallizes, producing a vacuum in the interior 20a of housing 20 so that pipes 12 and 14 and therefore flanges 13 and 15 become thermally insulated from one another.

For example, the switch 11 may comprise pipes and flanges constructed of copper. Stainless steel, which is a thermal insulator at temperatures below 30° K., is used for the housing 20 which is filled with hydrogen gas. When the temperature of the hydrogen gas reaches 10° K., the gas crystallizes and accumulates at the bottom of the switch 11 near flange 15. A vacuum is created in the interior 20a of housing 20, thermally insulating pipes 12 and 14 as well as flanges 13 and 15 from one another. The flanges remain insulated from one another as long as flange 15 on which the crystallized hydrogen is deposited, remains below the switching temperature 10° K.

From the foregoing description, it should thus be appreciated that the novel thermal switch of the present invention is adapted to control the conduction of heat between opposite flanges or contacts thereof so long as the temperature of the heat convecting medium such as the hydrogen gas herebefore referred to, is above its temperature of solidification.

The novel switch of the present invention finds particular utility in cooling systems which are used to produce cryogenic temperatures, required for the operation of various systems and circuits such as maser amplifiers. Presently known cooling systems for maintaining maser amplifiers at liquid helium temperature which is about 4.2° K., employ several successive interconnected refrigeration stages. The temperature of helium gas is successively reduced, the last stages of refrigeration reducing the temperature of the gas below its inversion temperature. Thereafter, the helium is further cooled by expansion, converting the gas to a liquid which passes through cooling coils surrounding the maser amplification system so that it is maintained at the desired temperature.

It is appreciated by those familiar with the art that the temperature of helium gas can be efficiently lowered to a temperature of about 40° K. in a relatively short time period. This is generally accomplished by utilizing several gas-expansion refrigeration stages which are of sufficient relative cooling capacities so that the gas is lowered to the design temperature. However, cooling the helium gas below 40° K. to a temperature level such as 16° K. by the inefficiency of the counter-flow heat exchangers and therefrom to a temperature level of 4.2° K., requires an appreciable time period as well as a considerable amount of energy. It has been found that the time required for cooling helium to a temperature level of 4.2° K. as well as the efficiency with which this is accomplished, are greatly enhanced by utilizing the novel thermal switch of the present invention.

Figure 3:
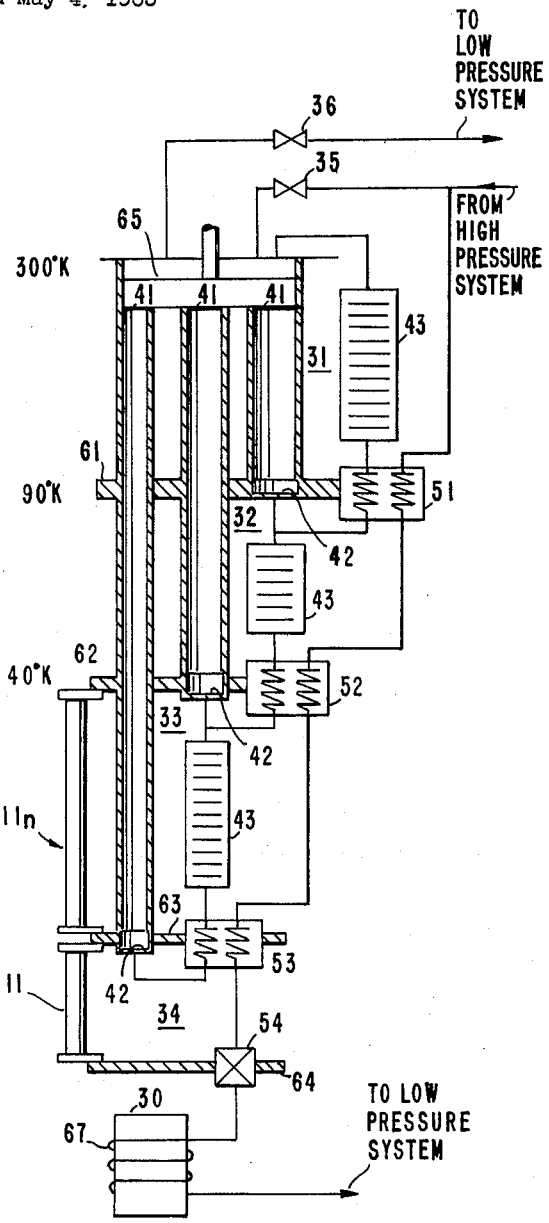
FIGURE 3 is a combination schematic diagram of a multistage cooling system employing the novel thermal switch of the present invention.

For a better understanding of the operation of an improved multistage cooling system for producing cryogenic temperatures down to liquid helium at improved efficiency and speed, by incorporating the novel switch of the present invention, reference is made to FIGURE 3 which is a schematic diagram of a multistage cooling system. For explanatory purposes, it is assumed that the system uses helium which is cooled to a temperature of 4.2° K. so as to cool a cryogenic system in a housing. The system is shown to comprise three basic gas expansion refrigeration stages 31 and 32 and 33. During each cycle of operation, helium gas at a gauge pressure of 285 p.s.i. is supplied from a compressor (not shown) to the system through an inlet valve. Then valve 35 closes and an outlet valve 36 opens permitting the helium to expand and be withdrawn at a gauge pressure of 80 p.s.i.

Each of the three cooling stages includes a displacer 41 mounted in a cylinder 42 and a single flow path regenerative heat exchanger 43. Stages 31, 32 and 33 also include heat exchangers 51, 52 and 53 mounted on cooling flanges 61, 62 and 63 respectively. The three displacers 41 are coupled to a single drive shaft (not shown) through a yoke 65 so that they reciprocate in unison.

As is known by those familiar with the art, each stage which can be throught of as comprising a displacer-regenerator stage, can be of a different cooling capacity so that after steady state cooling conditions are achieved, each of heat exchangers 51, 52 and 53, as well as flanges 61, 62 and 63, can be maintained at a different temperature level. Thus, heat exchangers 51, 52 and 53 may be controlled to be at temperature levels 90° K., 40° K., and 16° K. respectively so that helium passing through the three exchangers can be cooled down to 16° K.

The minimum temperature that can be reasonably obtained with displacer-regenerator stages is not low enough to liquify helium in order to obtain a temperature level of 4.2° K. Thus, the cooling system shown in FIGURE 3 incorporates a Joule-Thomson circuit as a final cooling stage 34 which includes an expansion valve 54 mounted on a flange 64. The helium gas under 285 p.s.i.g. cooled down to 16° K. is supplied to the expansion valve which enables the gas to expand to substantially zero gauge pressure. As a result of the expansion, the helium liquifies and cools the housing 30 by means of cooling coils 67.

As is well known by those familiar with the art, helium gas can be cooled quite efficiently and speedily to about 40° K., but the cooling of the gas down to 16° K. and especially further cooling it to 4.2° K., requires appreciable time and energy. In addition, due to the successively decreasing size of the stages, quite often a preceding stage reaches a lower temperature than a succeeding one. Such phenomenon is quite undesirable since it increases the amount of energy and the time required for the system to reach its steady state of operation.

Such disadvantageous features which are characteristic of presently known cryogenic refrigeration systems are substantially eliminated by incorporating the novel thermal switch herebefore described. As seen from FIGURE 3, the switch 11 which is filled with hydrogen and is designed to have a switching temperature of 10° K., is coupled by its opposite flanges 13 and 15 to cooling flanges 63 and 64. Thus, as long as the temperature of the hydrogen is above 10° G., flanges 64 and 63 will be in thermal contact so that stage 33, in addition to cooling gas passing through exchanger 53 and cooling flange 63, also cools flange 64 and the expansion valve 54 mounted thereon. However, when the temperature of the hydrogen in switch 11 drops to or below 10° K., the hydrogen crystallizes, thermally decoupling the cooling flanges 63 and 64 from one another. Thereafter, stage 33 maintains flange 63 at about 16° K. and the expansion of the helium gas in valve 54 of stage 34 further reduces the temperature of flange 64 until the temperature of 4.2° K. is achieved. However, by thermally coupling stages 33 and 34 so that the cooling energy of stage 33 is used to also cool stage 34 down to 10° K., the time required for stage 34 to further cool down to 4.2° K. is greatly minimized.

The efficiency of the cooling system of FIGURE 3 may further by increased by thermally coupling cooling flanges 62 and 63 of stages 32 and 33 with a second thermal switch 11n. The switch 11n is similar to switch 11 except that it is filled with a gas such as nitrogen which solidifies or crystallizes at approximately 60° K.

Thus, during the cooling down process, stages 33 and 34 are thermally coupled to stage 32 so that three stages are cooled down to the same temperature. However, when a temperature of approximately 60° K. is reached, the nitrogen in switch 11n crystallizes, thermally insulating stages 33 and 34 from stage 32. Thus, switch 11n greatly reduces the time required for cooling down stages 33 and 34 to 60° K.

The last two stages remain thermally coupled until stage 33 lowers the temperature of the hydrogen in switch 11 to approximately 10° K. At such temperature, the hydrogen crystallizes thermally disconnecting stages 33 and 34 from one another, with the latter stage further cooling the helium gas supplied thereto from exchanger 53 until the helium can be liquified by being expanded in valve 54. Thus, the incorporation of switch 11 results in a much faster reduction of the temperature of the helium to 4.2° K., thereby greatly increasing the overall speed at which steady state cooling conditions are reached as well as the overall efficiency thereof.

There has accordingly been shown and described herein a novel and useful automatic thermal switch which is particularly adapted to thermally decouple two flanges or surfaces from one another whenever a gas sealed within the switch is cooled, by heat transferred between the flanges, to a switching temperature at which the gas solidifies or crystallizes. The particular switching temperature is dependent on the properties of the gas in the switch. Incorporating one or more switches in a multistage cryogenic refrigeration system greatly improves such systems by increasing the efficiency and speed at which extremely low temperatures may be attained.

What is claimed is:

1. An automatic thermal switch comprising a housing of a material having thermal insulation properties below a predetermined temperature, said housing having two opposite open ends; a pair of flanges for sealing the opposite ends of said housing; a first pipe coupled to one of said flanges disposed within said housing; a second pipe coupled to the other flange, said second pipe being coaxially disposed over said first without being in contact therewith; a gas having a predetermined temperature of solidification lower than said predetermined temperature at which the material of said housing is substantially a thermal insulator, and at which said pair of flanges and said first and second pipes are thermal conductors, for thermally insulating said pair of flanges from one another at temperatures below said predetermined temperature of solidification.

2. An automatic thermal switch for thermally decoupling a pair of members from one another at temperatures below a predetermined switching temperature comprising a hollow housing having two opposite open ends, said housing being of a material which is substantially a thermal insulator at temperatures equal to and below said predetermined switching temperature, a pair of members for sealing the two opposite ends of said housing, said members being thermal conductors at temperatures equal to and below said predetermined switching temperature; and a gas within said sealed housing, said gas crystallizing at said predetermined switching temperature for transferring heat between said pair of flanges down to said predetermined switching temperature, and for thermally decoupling said pair of members from one another at temperatures equal to and below said switching temperature.

3. An automatic cryogenic thermal switch for transferring heat between a pair of heat conducting members down to a predetermined cryogenic temperature and for thermally insulating said pair of members from one another below said predetermined cryogenic temperature comprising a hollow housing of material which is a thermal insulator at temperatures above said predetermined cryogenic temperature, said housing having two open ends; a pair of members for sealing the two open ends of said housing, said members being thermal conductors at temperatures below said predetermined cryogenic temperature; and a gas having a temperature of solidification which is equal to said predetermined switching temperature, said gas being sealed in said hollow housing for transferring heat between said pair of members down to said predetermined cryogenic temperature, and for solidifying at said predetermined temperature to thermally insulate said pair of members at temperatures below said predetermined cryogenic temperature.

4. An automatic cryogenic thermal switch as recited in claim 3 wherein said predetermined cryogenic temperature is below the temperature at which stainless steel becomes a thermal insulator.

5. An automatic cryogenic thermal switch as recited in claim 3 wherein said hollow housing is of stainless steel, said pair of members are of copper and said temperature of solidification of said gas is below 40° K.

6. An automatic cryogenic thermal switch as recited in claim 3 wherein said hollow housing is of stainless steel, said pair of members are copper and said gas is hydrogen having a temperature of crystallization which is substantially 10° K.

7. An automatic cryogenic thermal switch as recited in claim 6 further including a first copper tube within said housing coupled to one of said members, and a second copper tube within said housing coupled to the other of said pair of members, said first and second tube being coaxially disposed with said hydrogen gas filling the space therebetween at temperatures above 10° K.

8. In a refrigeration system wherein a plurality of stages arranged in a sequence successively cools a gas to a predetermined cryogenic temperature the improvement comprising thermal switching means including gas for thermally coupling during the cooling down of said gas at least some of said plurality of stages to control the temperatures thereof, and for thermally insulating said stages from one another at temperatures equal to and below the temperature at which said gas crystallizes.

9. In a refrigeration system wherein helium is liquified by reducing the temperature of helium gas in a plurality of cooling stages with the cold gas being liquified in a liquification stage, the improvement comprising a thermal switch for thermally coupling said liquification stage to the last of said plurality of cooling stages during cooling down said helium gas, until the temperature of said last stage and said liquification stage is equal to a predetermined switching temperature, and for thermally decoupling the stages from one another at temperatures equal to or below said predetermined temperature.

10. In a refrigeration system as recited in claim 9 wherein said thermal switch comprises a hollow stainless steel housing having two opposite open ends; a pair of copper flanges for sealing said housing at the opposite open ends thereof, one of said copper flanges being thermally coupled to said last stage of said plurality of cooling stages and the other copper flange being thermally coupled to said liquification stage; and gas having a temperature of solidification which is lower than the temperature at which said stainless steel housing is a thermal insulator, for transferring heat between said last stage and said liquification stage down to said temperature of solidification, and for thermally insulating said stages from one another at temperatures below said temperature of solidification.

11. In a refrigeration system as recited in claim 10 wherein said gas is hydrogen.

References Cited by the Examiner

UNITED STATES PATENTS

| | | | |
|---|---|---|---|
| 2,010,180 | 8/1935 | De Ferronti | 165—135 |
| 2,853,279 | 9/1958 | Switzer | 165—135 |
| 2,966,035 | 12/1960 | Gifford | 62—6 |
| 3,004,394 | 10/1961 | Fulton | 62—3 |
| 3,112,651 | 12/1963 | Zingery | 165—135 |
| 3,128,605 | 4/1964 | Malaker | 62—6 |
| 3,209,818 | 10/1965 | Steele | 165—135 |
| 3,222,877 | 12/1965 | Brooks | 62—6 |

WILLIAM J. WYE, *Primary Examiner.*